Aug. 28, 1956 G. P. TOEWS 2,760,479
MEANS AND METHOD FOR OPERATING AN INTERNAL COMBUTION ENGINE
Filed April 24, 1953 3 Sheets-Sheet 1
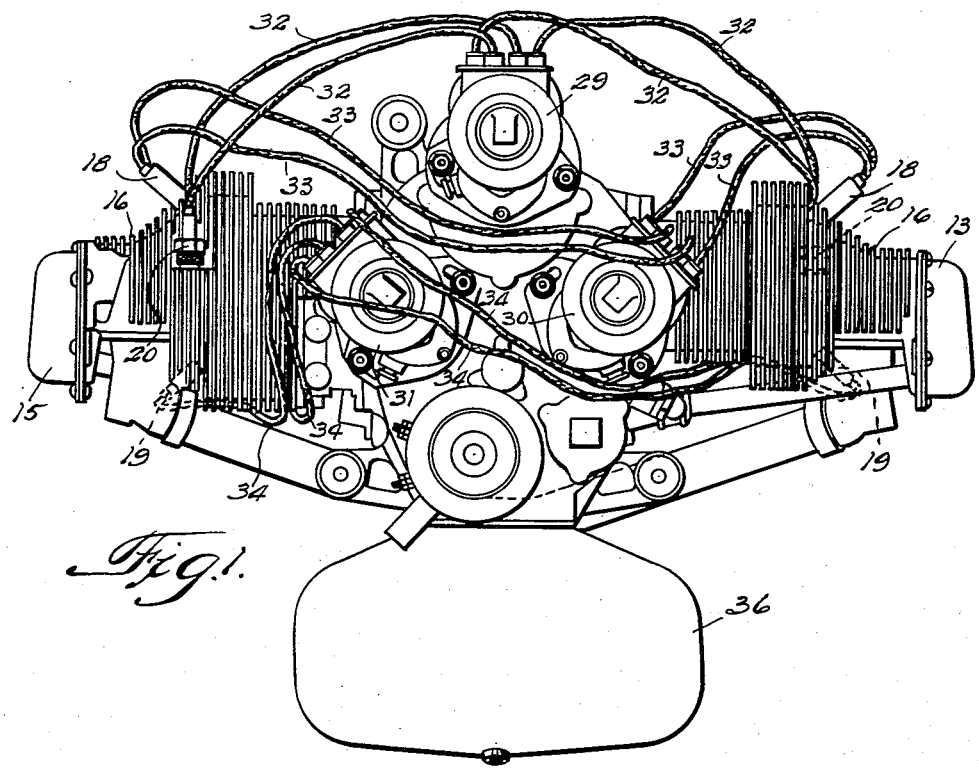
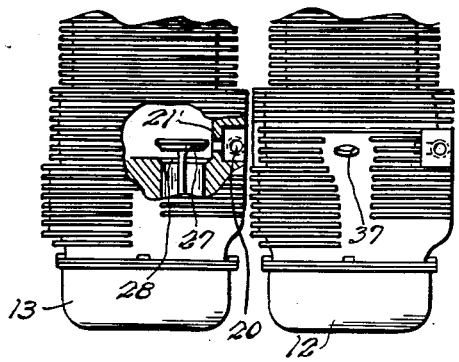
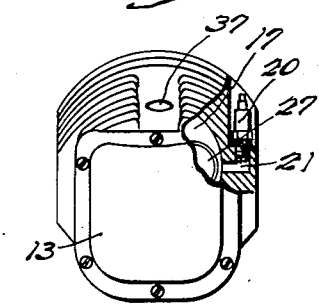
INVENTOR.
Gustav P. Toews Aug. 28, 1956 G. P. TOEWS 2,760,479
MEANS AND METHOD FOR OPERATING AN INTERNAL COMBUTION ENGINE
Filed April 24, 1953 3 Sheets-Sheet 2

INVENTOR.
Gustav P. Toews
BY
Thiess, Olsen, Mecklenburger,
von Holst & Coltman

Aug. 28, 1956 G. P. TOEWS 2,760,479
MEANS AND METHOD FOR OPERATING AN INTERNAL COMBUTION ENGINE
Filed April 24, 1953 3 Sheets-Sheet 3

INVENTOR.
Gustav P. Toews.
BY

United States Patent Office 2,760,479
Patented Aug. 28, 1956

2,760,479

MEANS AND METHOD FOR OPERATING AN INTERNAL COMBUSTION ENGINE

Gustav P. Toews, Clifton Heights, Pa., assignor to George B. Fowler, Blandford, Mass., as trustee Application April 24, 1953, Serial No. 350,866

1 Claim. (Cl. 123—191)

The present invention relates to an improved method of operating internal combustion engines employing igniters for firing a combustible charge within the cylinders of such engines, together with apparatus for carrying out the hereinafter claimed novel operating method.

The present invention is primarily an improvement on the invention disclosed in my Patent No. 2,481,890, patented September 13, 1949, in that it permits the ready adaptation of conventional internal combustion engines to the utilization of the said invention without the necessity of radically re-designing the engines.

As fully pointed out and claimed in my said patent, there are many important advantages in so controlling the combustion within the cylinder of an internal combustion engine that the area of final combustion is located away from the periphery of the piston and the walls of the cylinder. Furthermore, this enables the more complete utilization of the fuel by the engine, and also permits the use of fuels of much lower octane value, as any destructive effects of any possible detonation of the charge are virtually eliminated even under very high compression ratios.

As described in my Patent No. 2,481,890, these improved results are attained primarily by the selective arrangement and selective firing of the combustible charge within the cylinder of the engine by at least three spark plugs or similar igniters. The times of firing of these igniters was found to be quite important, as was also the specific location thereof. A particularly advantageous arrangement provided for the presence of at least one of the igniters at a point in relatively close proximity to the intake valve or valves of the cylinder. As pointed out in the above-mentioned Patent No. 2,481,890, a two-valve, two-igniter engine was found to develop final peripheral combustion and consequent peripheral piston burning near the intake valve. However, by locating an additional, third, igniter near the intake valve, this difficulty was avoided.

With an engine thus provided with three igniters, this added igniter was fired in several different timed relations with the normal igniters. Despite the running of this engine for excessive periods with low octane fuel, the normally expected piston periphery deterioration near the intake valve was not experienced. Rather, it was observed that the then affected area was positioned away from the periphery and towards the center of said piston. Thus it appeared that the studied and deliberate location and/or predetermined timed firing of an additional igniter in the area of normally-to-be-expected peripheral piston burning (or alternatively the normal area of final combustion) caused the removal of said area from the prejudicial vicinity.

While this novel concept proved to be very successful, there still, however, stood in the way of widespread utilization of the invention the fact that it was often difficult to apply the invention to multi-cylinder engines of either the radial, straight or horizontal opposed types by reason of the small space available for the positioning of the third igniter. In many commercially available engines the cylinders are in such close proximity that no space is available to place a third igniter. This is particularly true of air cooled engines, in which the cylinders are provided with radiating fins for dissipation of heat.

In an engine such as is diagrammatically illustrated in Figs. 9 and 10 of my Patent No. 2,481,890, there was ample room between the cylinders for placing the two normal, opposed igniters, and plenty of available space for placing the third igniter, therein marked "25."

This, however, is not true of many of the more recent types of air cooled engines, both automobile and aircraft types. Particularly is it true of so-called multicylinder horizontal opposed engines, which employ groups of closely adjacent sets of cylinders opposed to each other, as in such types of engines the inlet valves of one cylinder are alongside of the exhaust valves of an adjacent cylinder so that no space is available for the placing of the desired third igniter, even when no heat-dissipating fins are used thereon.

Accordingly, it is one of the objects of the present invention to provide means for placing a spark plug or other igniter so that it can function in the manner described in my aforementioned patent, without having radically to redesign the engine. When hereinafter the invention is more explicitly defined in connection with a horizontal opposed engine of the opposed groups of cylinders type, it will be fully understood by competent automotive and aviation engineers that the same principles are equally applicable to radial engines.

It is a further object of the present invention to provide means for firing the charge within the cylinder of an internal combustion engine by injecting a spit of flame into the cylinder from a point outside of the confining walls of the cylinder.

Still a further object of the present invention is to ignite a portion of the combustible charge outside of the cylinder, while also exploding the major charge within the cylinder by means of appropriately positioned igniters, thus injecting a flame under explosive force into the cylinder.

Still a further object of the present invention is to provide means for placement of a spark plug or other igniter in a cylinder in such a manner as to insure it against fouling as a result of or during engine operation, regardless of fouling that might occur in respect to other igniters of the same cylinder, with consequent positive insurance against engine failure due to fouling.

Other objects will become manifest from the concurrently filed drawings and the more detailed description hereinbelow.

In the drawings:

Fig. 1 is an end view of an engine of a four cylinder horizontal opposed type of engine, embodying the present invention;

Fig. 3 is a top view, partially in section, of two of the cylinders, namely those on the right hand side of the engine as seen in Figs. 1 and 2;

Fig. 4 is a side elevational view of one of the cylinders, so cast as to provide a third spark plug, being partly cut away to show the internal construction thereof;

In these figures only such parts of the engine are illustrated in detail as are necessary for a proper understanding of the invention, therefore the internal construction, such as connecting rods, details of pistons, timing mechanisms and the like have been omitted, as these are all standard and well known.

Figure 2:
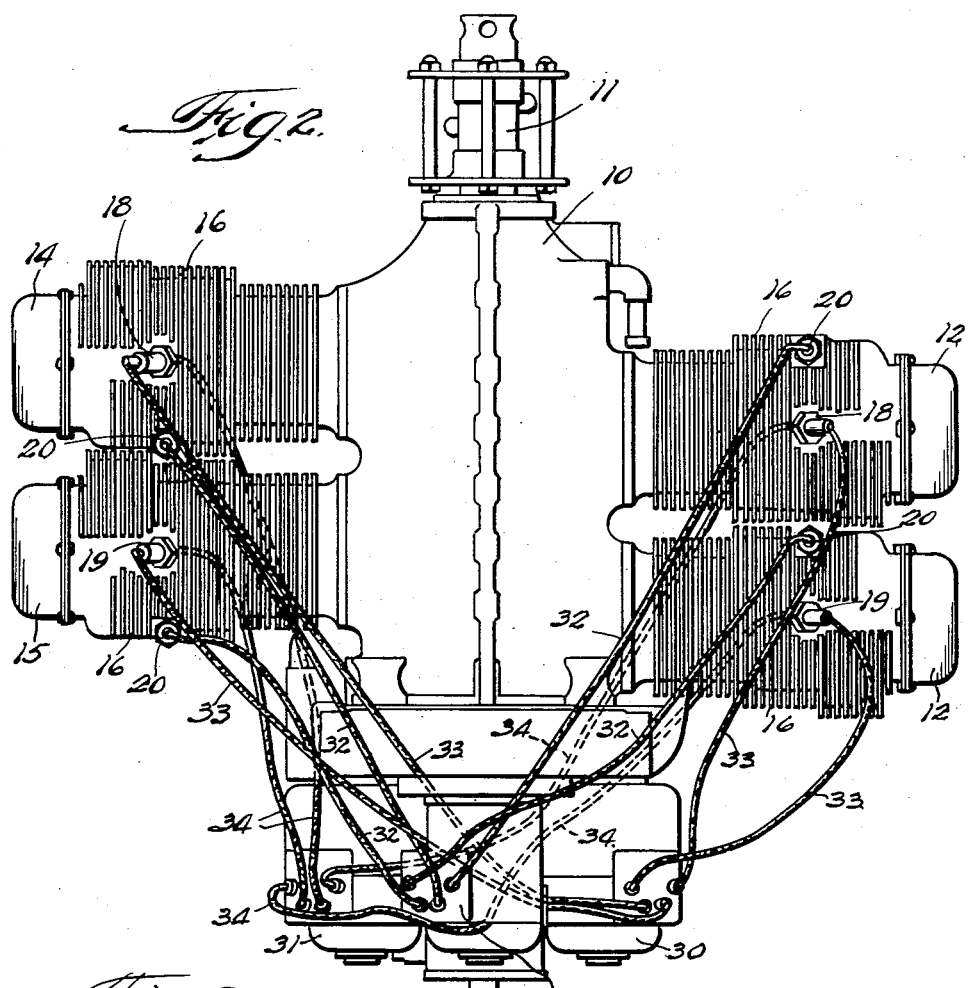
Fig. 2 is a top plan view of the same engine.

When referring to the front and rear of the engine, these ends are to be considered as interchangeable, depending upon whether the engine is used for actuating a propeller in an airplane, in which case the front of the engine is at the top of the drawing in Fig. 2, while if the engine is utilized in an automobile the other end will be the front, while the end which faces forward in an aviation engine will of course be connected to the transmission or drive shaft of the automobile or similar vehicle.

The engine illustrated is a four cylinder opposed type engine and by reason of its low over-all height is often spoken of in the industry as a horizontal opposed engine.

The invention is most easily described in connection with a single cylinder because it will be apparent that all four cylinders are of course structurally entirely alike.

The basic principle upon which the present invention is based is the recognition of the fact that it is possible to apply or locate a third spark plug in cylinders already having two opposed spark plugs therein without the necessity of radically re-designing the engine or particularly the cylinder construction thereof. While it would heretofore have been considered virtually impossible to do this because of lack of space, applicant found that, contrary to what would normally be expected, an igniter such as a high tension spark plug could be located outside of the confining walls of a cylinder provided only that there be a passageway from the point of location of the sparking point of the igniter to the main charge within the cylinder. This of course necessitated the proper location of such a passageway. It was found as a result of considerable research that for the proper functioning of such a device it was necessary that the passageway enter the cylinder at a point as nearly as possible directly opposite the plane of the bottom of the intake valve when the latter is in the open position, so that the incoming charge of explosive mixture of working fluid and fuel will be partly diverted by reason of the slope of the seat of the valve against the opening of the passageway so that some of the fresh mixture of working fluid and fuel will enter the passageway while at the same time burnt gases will be swept therefrom. When thereafter the additional spark plug located in or at the end of this lateral passageway is fired, the resulting flame will be explosively discharged into the cylinder at a point close to the intake valve, which by that time of course will be in the completely closed position. This therefore supplies a third point of ignition so that all the benefits described in applicant's prior Patent No. 2,481,890 will be attained.

It would normally have been expected that an engine would not operate in this fashion, but extensive tests have amply demonstrated that the two regular igniters or spark plugs can be disconnected and the engine operated entirely by means of the spark plug located in the lateral passageway.

Referring more particularly to the drawings, it will be seen that the engine consists of a main crank case portion 10, from one end of which there extends the shaft 11 for connection to a propeller, transmission or the like. Issuing laterally from the crank case there are the four cylinders 12, 13, 14 and 15, which, as will be seen, are provided in the usual manner with heat-dissipating fins 16, because this type of engine is air cooled.

Figure 5:
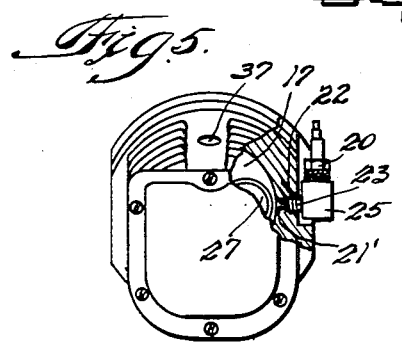
Fig. 5 is a side elevational view, partially in section, showing one of the right hand cylinders of the engine as shown in Figs. 1 and 2, to more accurately delineate the location of the adapter employed to position the third igniter.
Figure 6:
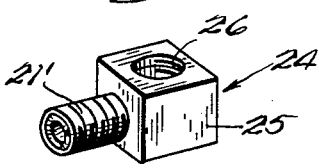
Fig. 6 is a view showing details of an adapter used in connection with the igniter show in Fig. 5.

Within the cylinders there are of course the usual pistons 17. There are two ordinary igniters or spark plugs 18 and 19, in each cylinder, which are located, respectively, on a center line between the intake and exhaust valves of the engine in the usual manner, being inserted in threaded openings 37 (see particularly Figs. 3, 4 and 5) which are drilled through the head or dome of the cylinders. As will be seen from the end view of Fig. 1, these spark plugs are respectively at the top and bottom of the cylinders. The third igniter of spark plug 20 for each cylinder is located so that its sparking points will be at the end of a lateral passageway 21, provided either in the walls of the cylinder as shown in Fig. 4, or in the form of a separate externally threaded tube 21' as for instance specifically shown in Fig. 5. This tube 21' is threaded into a suitable opening 22 which has been drilled into the side of the cylinder and has been provided with threads 23. More particularly when using a separate adapter 24 such as is illustrated in Fig. 6, the adapter consists of a body portion 25 and the therefrom laterally extending tube 21'. The spark plug 20 is screwed into a threaded opening 26 of said adapter.

Figure 7:
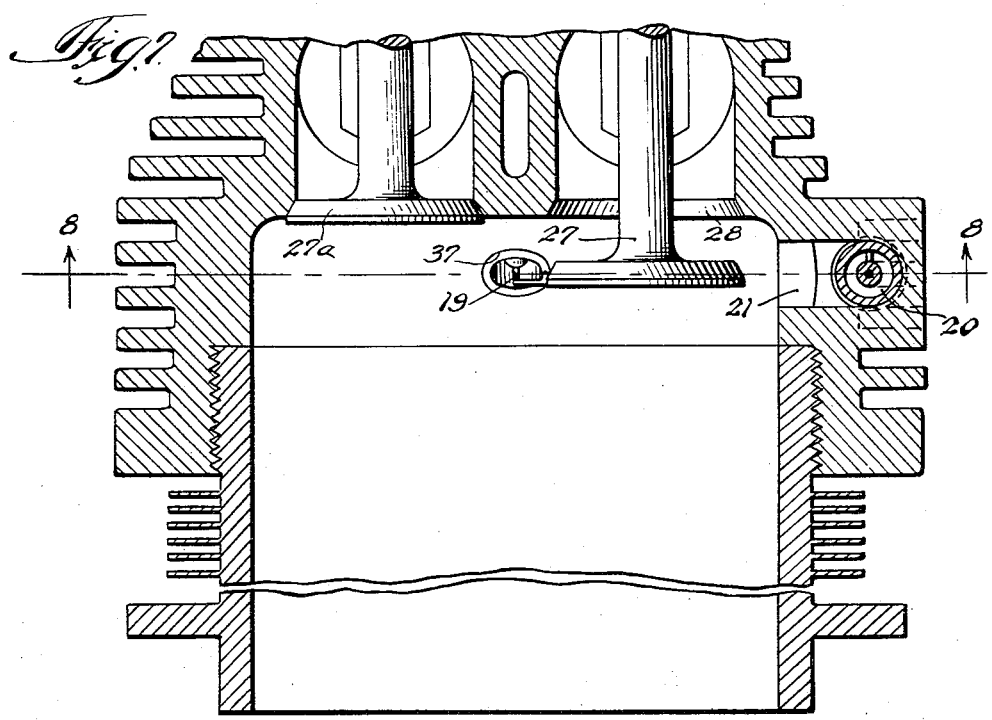
Fig. 7 is a cross section, on a considerably enlarged scale, of one of the cylinders, showing the exhaust and intake valves and the position of the auxiliary ignition tube and spark plug or igniter.

The intake valve 27 (see Figs. 3, 4 and 5) operates on its seat 28 and it will be seen that when the valve is open, as shown in Fig. 3, the plane in which the terminal edge of the sloping sides of the valve lie is directly opposite the center line of the passageway 21 or tube 21', for the purposes already mentioned. This is particularly well shown in Fig. 7, in which it will be seen that the valve 27, in its open position, as it is there shown, lies in such a way that it is substantially in alignment with the lateral passageway 21 in which the additional or third igniter 20 is located. This will insure the flow of the fresh combustible mixture so that a goodly portion of it will be directed into the passageway 21 to provide sufficient combustible gaseous mixture therein to permit it to be fired at the proper moment.

Figure 8:
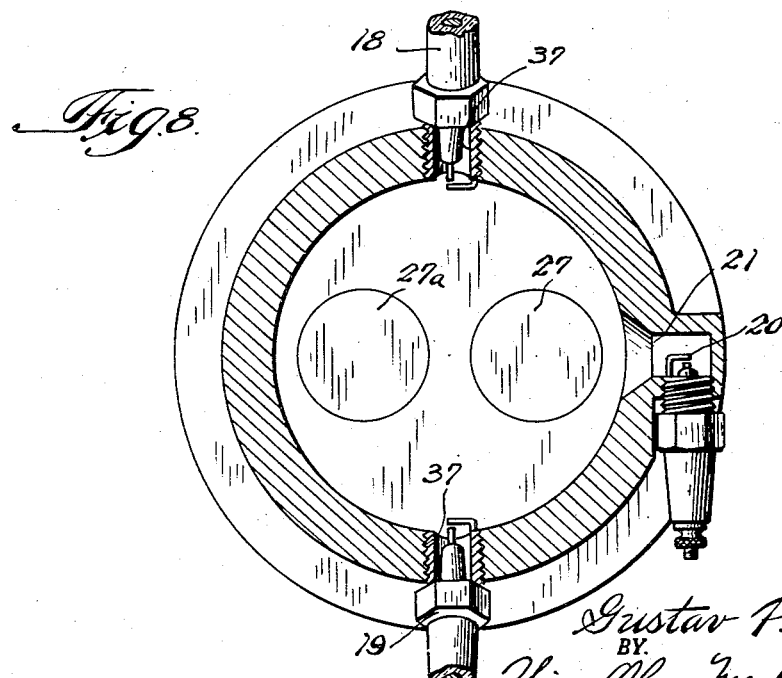
Fig. 8 is a cross section along the lines 8—8 of Fig. 7, showing the position of the three igniters.

In Fig. 8 there is particularly well illustrated the relative position of the normal openings 37 and the two normal igniters 18 and 19 (see also Figs. 1 and 2) and the position of the third or auxiliary igniter 20 in the passage 21. It will be noticed that the third igniter 20 is on a line which is substantially at a right angle to a line which connects the openings 37. It will also be noticed that a line drawn through the openings 37 in which the igniters 18 and 19 are located will also be at right angles to a line drawn through the center of the inlet valve 27 and the exhaust valve 27a.

The energy required for firing the igniters in each cylinder is provided by separate magnetos 29, 30 and 31, the magneto 29 in the present case being the one which supplies the third spark plug 20 with current through ignition wires 32. The other magnetos 30 and 31 supply their respective spark plugs 18 and 19 through ignition wires 33 and 34. The connections from the magnetos 30 and 31 to the spark plugs follow the standard construction, and are not considered as part of the present invention. The means for supplying the mixture of working fluid and fuel, namely the explosive charge, is not specifically illustrated, but it is to be understood that this can come from the normal standard type of carburetor or a fuel injection system. The exhaust gases are expelled from the usual type of manifolds, and as this has nothing to do with the present invention, these are not specifically mentioned, although indicated on the drawings.

It will be noticed that the third spark plug 20 is attached either by means of the adapter 24 and the threaded opening 26 thereof, or else is screwed directly into an offset provided in connection with the lateral passageway 21, being so positioned that the sparking points will be substantially in the center line of the passageway or tube. An oil sump 36 is provided to serve as a reservoir for the lubricating oil with which the engine is supplied in the usual manner.

Where the invention is adapted to an existing engine having the usual cooling means 16 it is merely necessary to cut away a sufficient number of them to provide for the adapter 24, but when building an engine upon the same basic crank case and other assembly parts, it will perhaps be simpler to cast the cylinder so as to provide the necessary metal at one side thereof in juxtaposition to the intake valve to provide for the lateral passageway 21 and the opening into which the third spark plug 20 may be screwed. Either types of construction are considered as being within the scope and purview of the present invention.

It will be noticed from the described construction that the two normal spark plugs are opposite each other in a straight line, at right angles to a line drawn respectively through the intake and exhaust valve of the engine (the exhaust valves are not illustrated, not being essential for an understanding of the construction).

When the intake valve 27 opens, the charge of the combustible mixture of gases and vapors, consisting of a suitable proportion of air and motor fuel, enters under the suction induced by the downward movement of the piston 17. As the charge enters the cylinder, a portion of it will flow into passage 21 and hence becomes available for ignition by an electric spark passing across the sparking points of the igniter 20. The rest of the charge enters the cylinder itself. The intake valve then closes and, under the influence of a suitable flywheel, crankshaft, and therewith connected connecting rods, the piston begins its compression stroke, thereby compressing the charge. Shortly before the piston arrives at its uppermost location in the cylinder, the igniters are fired in accordance with the principles of my Patent No. 2,481,890. As the portion of the charge in the passageway 21 explodes, it will cause the injection of a flame front into the cylinder, therefore igniting a portion of the charge therein. If the other two spark plugs are also fired, which is contemplated in the normal practice of the invention, the charge will also be ignited at the two other igniters, to produce three advancing flame fronts.

The relative time for initiating each of these flame fronts will depend upon whatever is the best minimum spark advance for the said flame fronts all together to give maximum power with final burning occurring only at or near center of combustion chamber.

In actual running of the engine equipped as just described, various spark advance positions were tried out. Spark advance, as is well known to automotive engineers, is measured in terms of degrees of the flywheel or propeller relative to the vertical position assumed either by the flywheel or propeller when the piston is at the exact top of its movement. Hence, if the spark is advanced, this can be expressed in degrees before the piston arrives at the top of its stroke. Spark advances of from 25° to 30° are quite common. As will be more fully explained below, the maximum power attainable at a constant throttle position varies with the spark advance, which, of course, should be adjusted to give optimum value.

It might have been expected that the combustion of the charge in the passage 21 and in the cylinder would, even after the exhaust stroke of the piston, during which the combustion products are pushed out through the then open exhaust valve, keep the passage 21 full of burned gases, and that, therefore, a second filling of the passage with fresh charge would be difficult. However, extensive tests have shown that this is not taking place. Primarily because of the preferred location of the passageway in close proximity to the intake valve, the incoming charge, by a sort of Pitot tube effect, pulls any residual gases out of the passage and permits entry of at least a sufficient volume of charge, which at that time is under only slight pressure. As the pressure in the charge increases as the piston rises during its compression stroke, quite enough of the combustible charge will enter the passage 21 to permit of its proper ignition by the igniter 20. This has been amply proved by actually operating the engine with only the igniter 20, which effectively ignited the entire charge. Even after many hours of continuous operation, the igniter sparking points and the igniter portions were clean and free from carbon deposits, thus showing that effective combustion was taking place.

The adaptation of the present invention to radial engines will be obvious. In any event, a suitable opening may be drilled or otherwise provided in the side of the cylinder in proximity to the intake valve and above the point of travel of the piston, and the additional spark plug placed therein, so that it may ignite a combustible charge in such passageway. The position of the spark plug in the passageway is not critical, provided only that the sparking points lie within the passageway or at the end thereof. It is not necessary to have the points inside of the cylinder. This construction, therefore, makes it possible to use standard types of spark plugs.

The present invention has been successfully applied to a standard type of engine, with eminently successful results.

I claim:

In an internal combustion engine the combination of a piston, a cylinder, and intake and exhaust valves within said cylinder, the improvement which comprises a passageway passing through the side wall of the cylinder and means for injecting a flame under explosive pressure into said cylinder through said passageway leading into said cylinder through said side wall at a locus in substantial alignment with the head of said intake valve when the latter is in its open position, the means for injecting said flame comprising an igniter associated with said passageway in such a manner that the sparking points of said igniter are within said passageway.

References Cited in the file of this patent

UNITED STATES PATENTS

| | | |
|---|---|---|
| 1,532,292 | Woolson | Apr. 7, 1925 |
| 1,580,420 | Dempsey | Apr. 13, 1926 |
| 1,847,612 | Horning | Mar. 1, 1932 |
| 1,913,310 | Moore | June 6, 1933 |
| 1,915,170 | Sorg | June 20, 1933 |
| 2,173,081 | Barkeij | Sept. 12, 1939 |
| 2,481,890 | Toews | Sept. 13, 1949 |

FOREIGN PATENTS

| | | |
|---|---|---|
| 273,163 | Great Britain | June 30, 1927 |